United States Patent [19]

Lyons

[11] Patent Number: 5,826,965
[45] Date of Patent: Oct. 27, 1998

[54] MODULAR LIGHT BAR

[75] Inventor: Harold W. Lyons, Killingworth, Conn.

[73] Assignee: Whelen Engineering Company, Inc., Chester, Conn.

[21] Appl. No.: 701,163

[22] Filed: Aug. 21, 1996

[51] Int. Cl.$^6$ ............................................. B60Q 1/00
[52] U.S. Cl. ........................ 362/74; 362/238; 362/240; 362/249; 362/368
[58] Field of Search ........................ 362/61, 74, 394, 362/287, 247, 249, 238, 368, 240, 396; 340/471, 472

[56] References Cited

U.S. PATENT DOCUMENTS

| | | | |
|---|---|---|---|
| 4,471,415 | 9/1984 | Larson et al. | 362/249 |
| 4,748,548 | 5/1988 | Barton | 362/249 |
| 4,956,753 | 9/1990 | Renfrew | 362/74 |
| 5,091,828 | 2/1992 | Jincks et al. | 362/249 |
| 5,097,397 | 3/1992 | Stanuch | 362/74 |
| 5,452,188 | 9/1995 | Green et al. | 362/74 |

*Primary Examiner*—James C. Yeung
*Attorney, Agent, or Firm*—Alix, Yale & Ristas, LLP

[57] ABSTRACT

A light bar assembly employs a unitary support member in the form of a mounting rail and a plurality of light modules which are configured to engage the mounting rail. In a typical use environment, there will be two basic light module configurations, i.e., a module configured for support from a straight section of the mounting rail and a module configured for support from a curved section of the mounting rail. The individual light modules may each include either or both mechanically driven and electronically controlled warning lights. Each of the light modules comprises a base, a light transmissive dome-shaped lens and one or more light sources, the base and dome lens being interlocked in sealed fashion and defining an enclosure for the light source(s). The base is provided with a channel which is sized and shaped to be in-part complementary to the exterior surface of a portion of the mounting rail. The light modules can be arranged in a variety of configurations on the mounting rail to collectively form an array of light modules.

31 Claims, 4 Drawing Sheets

MODULAR LIGHT BAR

BACKGROUND OF THE INVENTION

(1) Field of the Invention

The present invention relates to warning light systems intended primarily for installation on land and marine vehicles and, particularly, to light bar assemblies of modular design which can be readily customized to meet the use environment. More specifically, this invention is directed to an aerodynamically efficient warning light assembly characterized by ease of assembly, installation and maintenance. Accordingly, the general objects of the present invention are to provide novel and improved apparatus of such character.

(2) Description of the Related Art

Warning light assemblies in the form of light bars mounted on emergency vehicles are well-known in the art. For the most part, prior art light bars have been characterized by a relatively high degree of wind noise and resistance and by a size and shape which significantly increases overall vehicle height. These disadvantageous characteristics, in part, resulted from the fact that these light bars were necessarily mounted in spaced relationship to the roof of a vehicle. Additionally, many previously available light bars were characterized by rigidity in design, i.e., the number, placement and type of active warning devices could not be easily varied to meet the requirements of the end use or user. An exception to the foregoing is the light bar of U.S. Pat. No. 4,620,268.

While the light bar of U.S. Pat. No. 4,620,268 has enjoyed great commercial success, the patented assembly was designed with an eye toward employment of light sources which produce a pulsating output under electronic control, i.e., light sources employing gaseous discharge tubes or high-intensity incandescent lamps. There are, however, two basic types of light sources capable of generating a flash pattern. These two different types of pulsed light sources consist of the above-mentioned electronically controlled sources and mechanically driven, i.e., rotating or oscillating, sources. The mechanically driven sources typically employ a rotatably driven subassembly including a constantly energized lamp with an associated reflector, the driven subassembly often cooperating with one or more stationary mirrors. Both types of pulsed light sources have attributes which will not be discussed herein. Suffice it to say that users and/or end use environments dictate the particular type of pulsed light generator which is to be utilized. The light bar configuration which is deemed to afford optimum visibility may utilize both types of pulsed source.

There has been a previously unsatisfied demand for an improved aerodynamically efficient light bar assembly which would readily accommodate any desired arrangement of electronically controlled and/or mechanically driven pulsating light sources, often in combination with one or more flood lights.

There has also been a previously unsatisfied demand for a light bar which may be assembled, on a common support from a plurality of individually sealed light modules. Such a construction would facilitate customization and allow individual modules to be serviced and/or removed without disassembly of the entire light bar.

Yet another previously unsatisfied demand in the warning light field has been for a modular light bar having a unitary member capable of performing the dual functions of supporting, without housing, the light modules and defining a conduit or channel for the electrical conductors which supply operating power to the light sources. Such a unitary support member would desirably be capable of extending around corners on a vehicle to thus enable the light bar assembly to provide illumination visible from more than one side of a vehicle on which the light bar assembly was mounted. Such a support member would also free the light bar design from the prior art constraint of arranging the light sources in one or more linear arrays.

SUMMARY OF THE INVENTION

The present invention overcomes the above-briefly discussed and other deficiencies of the prior art, and in so doing satisfies the above-discussed demands, by providing a novel and improved modular light bar assembly. A light bar assembly in accordance with the invention preferably employs a unitary support member in the form of a mounting rail, this rail defining an interior channel through which power supply conductors may be routed. A light bar assembly in accordance with the invention also comprises a plurality of light modules which are configured to engage the mounting rail. In a typical use environment, there will be two basic light module configurations, i.e., a module configured for support from a straight section of the mounting rail and an elbow-shaped module configured for support from a curved section of the mounting rail. The individual light modules, based upon requirements dictated by the use environment or the user, may each receive and support stationary, mechanically driven and electronically controlled warning lights either alone or in combination with one another.

Also in accordance with the invention, each of the light modules will comprise a base and a light transmissive dome, the base and dome being interlocked in sealed fashion and defining an enclosure for the light source(s). The base is provided, adjacent a rear side thereof, with a channel which extends between a pair of opposite side walls. This channel is sized and shaped to be in-part complementary to the exterior surface of a portion of the mounting rail. The dome, which is preferably removably attached to the base, may be comprised of either substantially transparent plastic or tinted plastic which will impart a desired color to light passing therethrough. The light source(s) are supported within each module from the base.

BRIEF DESCRIPTION OF THE DRAWINGS

The present invention may be better understood, and its numerous objects and advantages will become apparent to those skilled in the art, by reference to the accompanying drawings wherein like reference numerals refer to like elements in the several Figures, and in which.

DESCRIPTION OF THE DISCLOSED EMBODIMENTS

Figure 1:
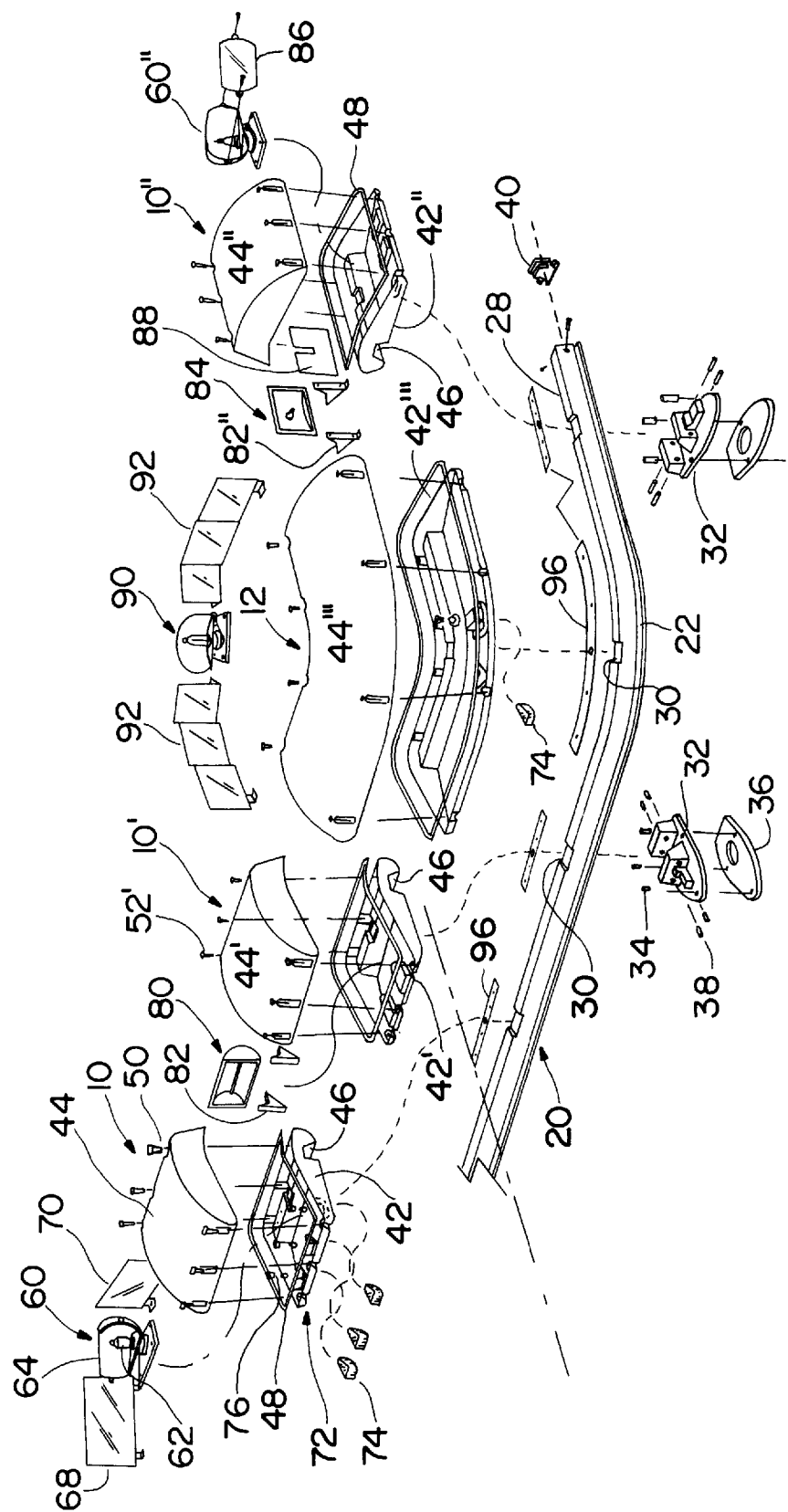
FIG. 1 is an exploded, perspective view of a portion of a light bar assembly in accordance with the invention.

With reference now to the drawings, one half of a modular light bar assembly in accordance with a first embodiment of the present invention is depicted in FIG. 1. This light bar assembly is, for example, intended for mounting on the roof surface of the cab portion of an emergency vehicle such as a fire truck. The light bar assembly is defined by a serial array of light modules which are capable of illuminating an ambient environment. In the disclosed embodiment, the light bar employs light modules having two different exterior configurations. A first of these light modules, which is employed in a linear portion of the light bar assembly, is indicated generally at 10. The second type of light module is a curved or corner module which is indicated generally at 12. The light modules 10 and 12 are assembled, in the manner to be described below, so as to define an array of abutting modules which collectively present a substantially continuous exterior surface.

Figure 2:
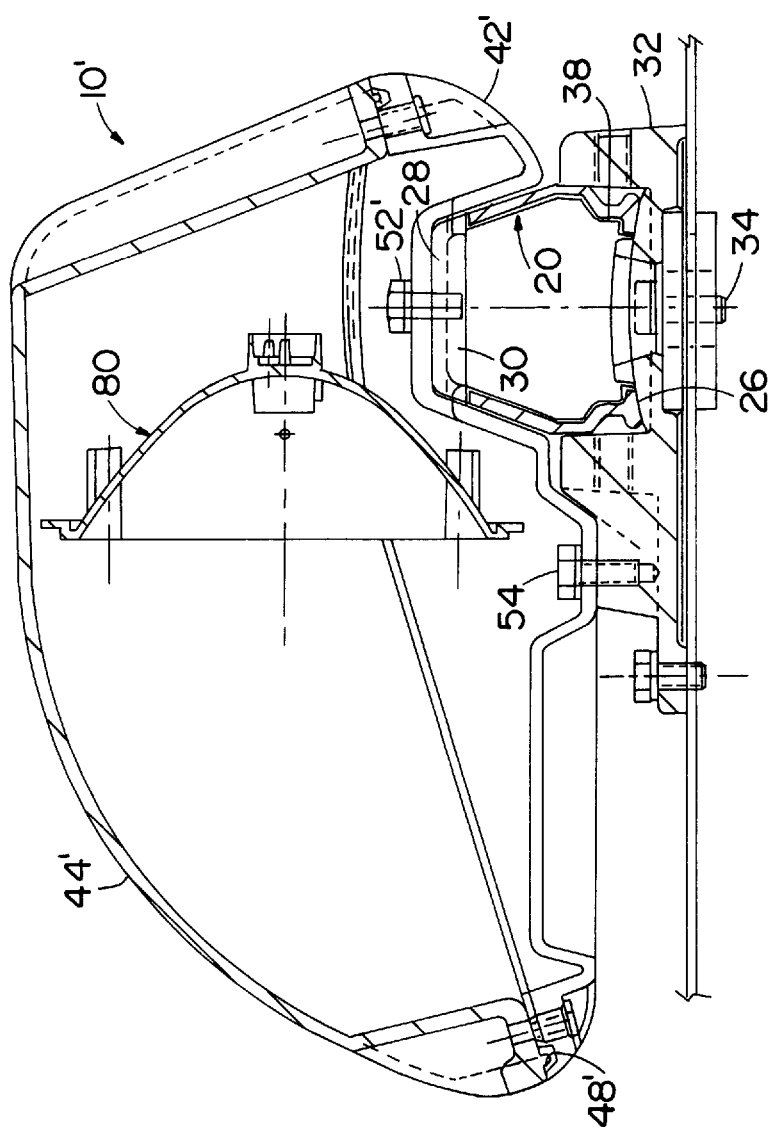
FIG. 2 is a cross-sectional, side-elevational view taken through the center of one of the linear light modules of the light bar assembly of FIG. 1.
Figure 3:
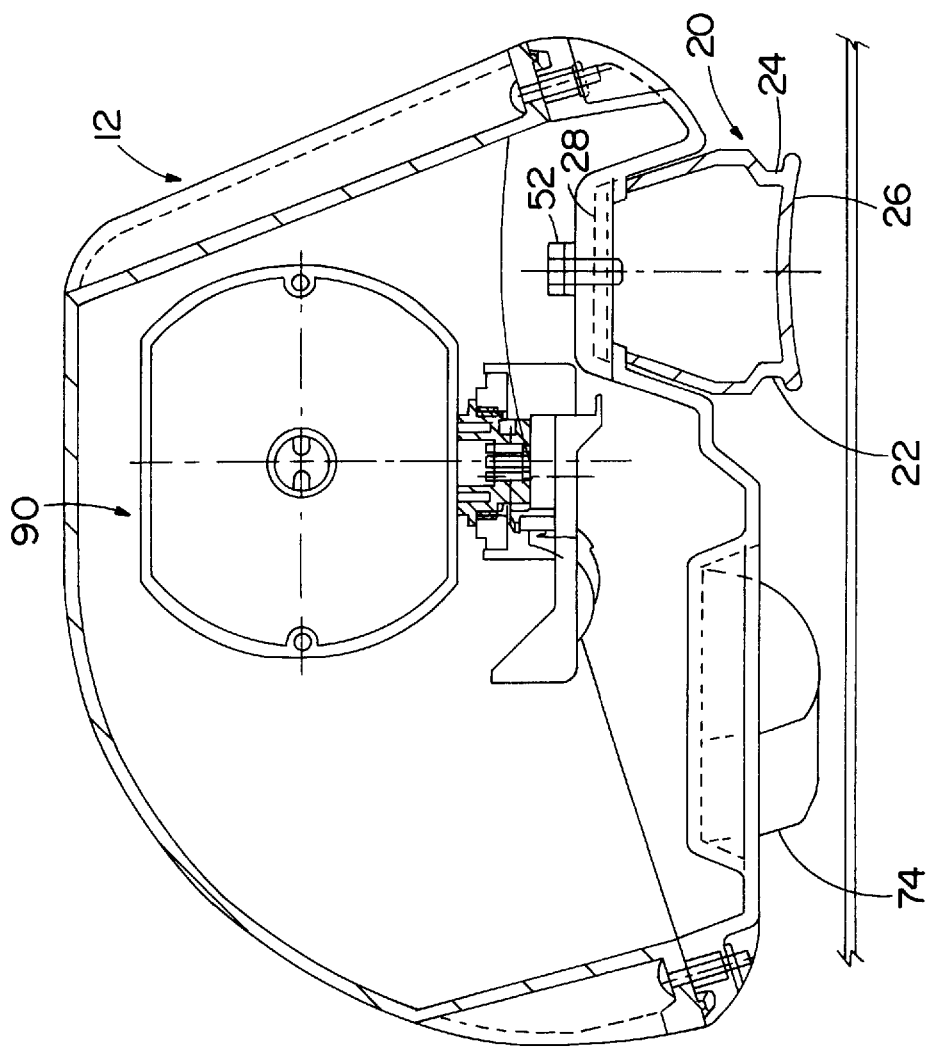
FIG. 3 is a cross-sectional, side-elevational view taken through the center of the curved light module of the light bar assembly of FIG. 1.

Continuing to refer to FIG. 1, and as also shown in FIGS. 2 and 3, the light bar assembly has a unitary support member, in the form of extruded aluminum mounting rail, indicated generally at 20. Rail 20 is hollow and defines an inner channel or conduit through which electrical conductors (not shown) which deliver power and control signals to the light modules, are routed. Mounting rail 20 is shaped to define, on the exterior of the opposite sides thereof, a pair of oppositely facing grooves 22 and 24 which extend the length of rail 20. As may best be seen from FIG. 3, grooves 22 and 24 are located in the sides of the rail immediately above and adjacent to a curved base portion (or, alternatively, bottom) 26. In the disclosed embodiment, the upper portions of the sides of rail 20 taper inwardly, from points located above the grooves 22, 24, to the rail top 28. The top 28 of rail 20 is provided with a plurality of apertures 30. The apertures 30 permit electrical communication, via conductors routed through the interior of rail 20, to light generators located within the modules 10 and 12.

Mounting rail 20, in the disclosed embodiment, is immovably mounted to a vehicle via a plurality of identical mounting feet 32 which may be seen from FIGS. 1 and 2. The mounting feet 32 will typically be aluminum castings which define a slot for receiving the lower portion of rail 20 the slot and rail lower portions having generally complementary shapes as best seen from FIG. 2. Each mounting foot 32 will be secured to the vehicle via a plurality of mechanical fasteners 34 which pass through the base portion of the foot. A seal member, typically a die-cut neoprene sponge seal such as indicated at 36, will be interposed between the base of each mounting foot 32 and the exterior surface of the vehicle. The mounting feet 32 and seals 36 will be provided with aligned, centrally disposed openings such that the electrical conductors which deliver power and control signals to the light bar assembly may pass from the interior of the vehicle into the mounting rail 20 via a mounting foot or a plurality of the mounting feet. To permit such conductor routing, the bottom 26 of the mounting rail 20 will be provided with an opening(s) in registration with the aligned openings in a mounting foot and its cooperating seal and a suitable seal will be created around such opening.

The mounting rail 20 is secured to the mounting feet 32 by means of a plurality of set screws 38, four such set screws being employed on each mounting foot in the disclosed embodiment. The set screws 38 extend through, and threadably engage, the oppositely disposed, upwardly extending, slot-defining walls of the mounting feet. As may best be seen from FIG. 2, the set screws 38 engage the base portions of the grooves 22, 24 in the sides of mounting rail 20 and firmly lock the mounting rail to the mounting feet.

In order to seal the opposite ends of the tubular mounting rail 20, a plug 40 is press-fit into each end of the rail and secured in position by means of suitable mechanical fasteners.

Each of the light modules includes a base 42 and a dome 44, the base and dome cooperating to define an interior chamber in which the light source(s) are mounted also defining the exterior shape and an exterior surface of the light module. Each base 42 is provided with a longitudinally extending external channel 46 having a cross-sectional configuration which is generally complementary to the exterior surface configuration of the cooperating upper portion of mounting rail 20. In the disclosed embodiment, the channels 46, when viewed in cross-section, are narrower at the bottom than at the opposite, downwardly facing, open ends and are in part defined by a pair of oppositely disposed, substantially flat surfaces which diverge. Channel 46 extends between a pair of opposite sides of base 42 in a region adjacent to the rearwardly disposed side of the module i.e., the longitudinal channel 46 of each light module extends substantially parallelly with the adjacent rear side of the module and thus the channels are either linear or curved depending on where along rail 20 the module is to be positioned. Base 42 has a generally tray-like configuration, i.e., the base has upwardly extending side walls which, along their upper edge, are provided with a continuous groove for receiving a sponge cord seal 48. The interior side walls of base 42 are provided with a plurality of bosses, there being six such bosses in the disclosed embodiment, which are tapped so as to engage the mechanical fasteners 50 by which dome 44 is secured to base 42 of the module.

The domes 44 are shaped to mate with a cooperating base 42, the seal 48 being compressed between the dome and base when these components are tightly secured together by means of the fasteners 50. The fasteners 50 pass through openings provided therefor about the perimeter of the dome 44. Both the base 42 and dome 44 of each module are molded plastic components and may be comprised of clear plastic or may be tinted so that a desired color is imparted to light, emanating from a white light source located within the module, transmitted through the dome. The dome, thus, acts as a light transmissive lens.

The light modules 10, 12 are removably connected to a making section of mounting rail 20 by any suitable means. In one reduction to practice, holes were drilled in the top 28 of rail 20 and clinch nuts installed in these holes. Mechanical fasteners, such as the screw indicated at 52 in FIG. 2, were then passed through openings provided in the bottom of base 42 and caused to engage the installed nuts. As may be seen from FIGS. 2 through 4, the primary support of the linear light modules, such as modules 10' and 10" from rail 20 in the disclosed embodiment is provided by the contact between the rearwardly facing side wall of channel 46 and the cooperating forwardly facing upper wall portion of rail 20. Thus, these modules are effectively cantilevered from the support rail. Accordingly, while contributing to the structural integrity of the assembled light bar, the fasteners which mechanically connect the base 42 of each module to mounting rail 20 primarily function to position the module on the mounting rail. Additional support of the modules on rail 20 may be provided by fasteners, such as screw 54 (FIG. 2), which pass through the base 42 of the module and engage a tapped hole in a mounting foot 32. In the disclosed embodiment, the stand-off, i.e, the clearance between the bottom of the light modules and the vehicle, is minimal. The minimized clearance, in combination with the aerodynamic shape of the domes 44, significantly reduces wind resistance and noise while, at the same time, defining interior spaces sufficiently large to place no restraints on design. In one reduction to practice, a forwardly disposed portion of each light module actually contacts the exterior surface of the vehicle.

As noted above, base 42 and dome 44 of each light module cooperate to define an enclosure in which one or more light sources are positioned. FIG. 1 shows three of the linear light modules 10, 10' and 10" in association with a single curved light module 12. Light module 10 houses a single rotating light source, indicated generally at 60, comprising a lamp 62 with an associated reflector 64 mounted on a common base which is caused to rotate by a drive motor. Light source 60 may, for example, be of the type disclosed in U.S. Pat. No. 5,160,874. In the interest of facilitating understanding of the present invention, the motor, gearing and electrical circuit components of light source 60 have not been identified and/or shown in the drawings. Rotating light source 60 is associated with a pair of fixed position mirrors indicated at 68 and 70. Source 60 of module 10 and mirrors 68 and 70 are all mounted to base 42 by mechanical fasteners with the location and angular orientation of the mirrors 68 and 70 relative to the focal point of the rotating source 60, being selected to provide a desired flash pattern.

Linear module 10 is also provided with a plurality of clearance lights such as the light indicated generally at 72 in FIG. 1. The clearance lights 72 of the disclosed embodiment each include a lens cap 74 which is received in a complementary shaped recess provided in the bottom of the exterior of base 42, a seal being positioned between each lens and the base. The clearance lights include snap-in lamp holders which engage supports provided on the interior of the bottom of base 42. In the embodiment being described, the lamps 76 of the clearance lights extend through knock-outs provided in the tops of the recesses in base 42 which receive the lenses 74. The location and number of clearance lights, when included in the light bar, will be dictated by DOT regulations. The clearance lights will be installed in a light module prior to the mounting thereof on rail 20. Such installation will be accomplished by means of a mechanical fastener which extends through an opening provided in the lens 74. Clearance lights may thus be integrated with the base of a module when required. Clearance lamp replacement will be performed from the top of the light bar, i.e., by removing dome 44 and freeing the snap-in lamp holder from its support.

Figure 4:
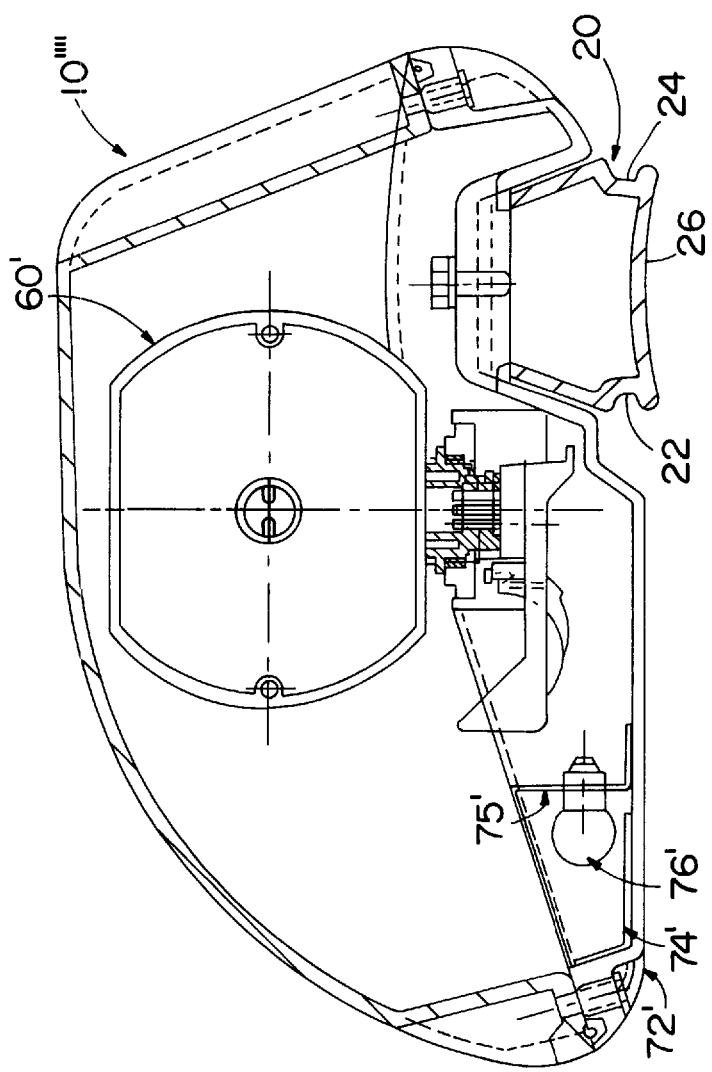
FIG. 4 is a cross-sectional, side-elevation view of an alternative embodiment of light module 10.

As shown in module 10"" of FIG. 4, the portion of the base of a light module through which the clearance lights will be seen may, alternatively, be integrally molded with base 42, i.e., the separate lenses 74 may be eliminated. As shown therein, clearance light 72' includes light emitter 76' disposed within the interior chamber of module 10"". A reflector 75' is preferably disposed behind light emitter 76 to reflect light incident thereto through lens 74 and into the ambient environment. This is a particularly desirable approach when a forward portion of the module rests upon the vehicle. While module 10"" is shown with a rotating light assembly 60', module 10"" could also include another light emitter means shown and described herein. Since the clearance lights must be amber, when the lens(es) therefor is integral with the base, the base 42 may be molded from optically clear plastic (i.e., a light transmissive lens portion) and a filter 74 may be provided inside of base 42 for the clearance lamp(s). In the embodiment of FIG. 1, the base 42 of module 10 may be molded from opaque material and the lenses 74 will impart the requisite color to the light provided by lamps 76.

Module 10' is shown in FIGS. 1 and 2 as including a strobe light subassembly 80, i.e., a light head, comprising a linear flash tube and associated reflector. Light head 80 is mounted to base 42 by means of a pair of brackets 82. Module 10' otherwise differs from module 10 only in the absence of the clearance lights.

Module 10" includes, mounted side-by-side, a mechanically rotated light source 60" and a spotlight subassembly 84. As in the case of module 10, module 10" includes a transparent dome 44". Thus, in order to obtain flashing light of a preselected color, a filter 86 is attached to the reflector of the rotating light assembly 60" in front of the light source which, typically, will be a halogen lamp. The spotlight subassembly 84 includes a light source, which may also be a halogen lamp, with an associated compound parabolic reflector. A prismatic inner lens 88 is attached to the reflector of the spotlight subassembly 84 to redirect the light beam emanating from the reflector in a desired direction. Typically, the combination of reflector and lens will cause the spotlight to illuminate a predetermined area disposed on the ground at the side of the vehicle. The spotlight assembly 84 is mounted to base 42" by means of a further pair of the brackets 82". The combination of the spotlight subassembly 84 and its cooperating prismatic lens 88 may, for example, be designed in accordance with the general teachings of U.S. Pat. No. 5,040,103.

The curved light module 12 of the disclosed embodiment of the invention (shown in cross-section in FIG. 3) includes a single rotating light source 90. Source 90 may be identical to source 60 and is located intermediate the ends of a base 42''' which transcribes an angle of 90°. A stepped mirror 92 is located at each side of source 90 to provide a series of flashes as the light beam produced by reflection from the parabolic reflector of source 90 is swept across the mirrors, i.e., the beam focused by the reflector of the rotating source will be serially reflected by the faces of the stepped mirror and the result will appear, to an observer viewing the light through the dome 44''', to be a series of light flashes. Dome 44''' may, of course, either be clear or tinted.

To minimize the possibility of moisture leakage from the ambient atmosphere into either the mounting rail 20 or the various light modules, a neoprene sponge seal 96 is provided in the base of each of the channels 46.

It will be understood by those skilled in the art that a light bar assembly in accordance with the invention may accommodate any suitable light source including incandescent lamps, gaseous discharge tubes and high intensity discharge lamps. The light sources may be mixed as desired and plural sources may be included in a single module. Such plural sources may be located in a side-by-side arrangement, as depicted in the case of module 10", or may be vertically stacked. In some cases, for example when an HID source is utilized, a power supply for the light emitter may be mounted with the module.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A modular vehicular lightbar comprising:

a support member for supporting a plurality of light modules, said support member comprising an elongated tubular mounting rail having upper and lower portions, said upper and lower rail portions extending the length of said rail and having different cross-sectional shapes;

foot means for affixing said rail to an exterior surface of a vehicle, said foot means comprising at least two spacially displaced mounting feet disposed between said rail and the surface, each of said feet defining an open-sided slot, said rail lower portion being received in said slots and engaged by said feet; and a plurality of light modules, said modules being positioned along and at least in part supported from said rail, each of said light modules comprising:

a base, said base including at least a bottom wall and first and second opposing side walls, said bottom wall including an external open-sided base channel which extends between said first and second side walls, said base channel being generally complementary in cross-sectional shape to the cross-sectional shape of said upper portion of said mounting rail, said base channel engaging said rail upper portion;

a light transmissive lens affixed to said base, said lens cooperating with said base to define a chamber therebetween; and at least one light emitter disposed within said chamber, said light emitter being affixed to said base such that at least a portion of the light emitted thereby passes through said lens.

2. A modular light bar as recited in claim 1, wherein said rail has at least a first linear segment and at least a curvilinear segment extending from an end of said linear segment, wherein said base and said lens means of at least one of said light modules cooperate to define a light module configured for mounting on said rail at said curvilinear segment thereof.

3. A modular lightbar as recited in claim 1, wherein a portion of said base of at least one of said light modules defines a light transmissive lens for at least a first clearance light, and wherein said one of said light modules further includes a clearance lamp supported within said chamber such that at least a portion of the light emitted by said clearance lamp passes through said clearance light lens.

4. A modular lightbar as recited in claim 1, wherein said base of each of said light modules is provided with an opening extending through said bottom wall and into said base channel, and wherein said rail is provided with a plurality of apertures through which communication may be established between the interior of said tubular rail and the chamber of each of said modules via said openings.

5. A modular light bar as recited in claim 1, wherein adjacent light modules abut one another such that said exterior surfaces of said plurality of light modules collectively present a generally continuous exterior surface.

6. A modular light bar as recited in claim 1, wherein said base channel of at least one of said light modules extends linearly between said first and second side walls.

7. A modular lightbar as recited in claim 6, wherein said rail is non-linear and comprises both linear and arcuate segments, and wherein said base channel of at least one of said light modules has an arcuate shape which matches at least a portion of said arcuate rail segment.

8. A modular light bar as recited in claim 1, wherein at least one of said light modules includes at least a second light emitter, at least one of said light emitters comprising a warning light assembly.

9. A modular light bar as recited in claim 1 wherein said mounting rail and said base channel are provided with at least first complementary shaped bearing surfaces which are in abutment whereby said light modules are at least partly cantilevered from said mounting rail.

10. A modular light bar as recited in claim 9 wherein complementary surfaces are at least in part linear, said linear surfaces extending angularly with respect to a plane transverse to a surface to which said feet are affixed.

11. A modular lightbar as recited in claim 1, wherein each of said feet includes means for releasably capturing said rail in said slot.

12. The modular lightbar as recited in claim 1, wherein said upper portion of said rail is defined by a top surface and a pair of side surfaces which extend therefrom in the direction of said rail lower portion, said side surfaces defining a rail cross-section which enlarges from said top surface in the direction of said rail lower portion.

13. The modular lightbar as recited in claim 12 wherein said rail side surfaces diverge relative to one another from said top surface in the direction of said rail lower portion.

14. A modular vehicular lightbar comprising:

an elongated tubular mounting rail, said rail having an exterior surface defined by upper and lower portions which extend the length of said rail, said upper and lower rail portions having different cross-sectional shapes; and a plurality of light modules positioned on said mounting rail, each of said light modules comprising:

a base, said base having a bottom wall and a pair of opposing side walls which extend outwardly from said bottom wall, said base further having a rear wall which extends between said side walls, said bottom wall including an external channel which is proximal to said rear wall, said channel extending longitudinally between said pair of side walls and being substantially parallel to said rear wall, said channel being generally complementary in shape to said upper portion of said exterior surface of said rail, said channel of said base engaging said rail along a portion of the lenath thereof;

a light transmissive lens sealingly attached to said base, said lens and said base cooperating to define a chamber therebetween; and at least one light emitter disposed within said chamber, said one light emitter being affixed to said base and being positioned such that at least a portion of the light emitted by said one light emitter passes through said lens.

15. The modular lightbar of claim 14 further comprising:

a plurality of spacially displaced mounting feet for rigidly mounting said rail to an exterior mounting surface of a vehicle, each of said feet defining an open-sided slot of generally complementary cross-sectional size and shape to at least a part of said lower portion of said rail, said rail lower portion being received in said slots and being rigidly engaged by said feet, said feet being rigidly mounted to the vehicle mounting surface.

16. The modular lightbar of claim 15 wherein the vehicle mounting surface has at least one aperture extending therethrough, wherein at least one of said feet has a passage therethrough extending from said slot, wherein said rail includes a bottom wall having a hole extending therethrough, said rail further defining an interior channel which is in registration with said hole, and wherein the mounting surface aperture, said hole and said passage are, at least in part, in registration with one another.

17. The modular lightbar of claim 14 wherein at least one of said light modules further comprises at least a second light emitter disposed within said chamber and affixed to said base such that at least a portion of the light emitted from said second light emitter passes through said lens.

18. The modular bar of claim 14 wherein at least one of said light modules further comprises at least one clearance light, said clearance light comprising a light transmissive lens cap, said lens cap cooperating with said base to define a second chamber therebetween, said clearance light further comprising a lamp disposed within said second chamber, at least a portion of the light emitted by said lamp passing through said lens cap.

19. The modular lightbar of claim 18 wherein said lens cap is integrally formed with said base.

20. A modular light bar assembly as recited in claim 14, wherein said rail is a generally U-shaped rail having a pair of generally parallel linear members, a bottom member extending between said linear members, and first and second curved regions connecting said bottom member to said linear members.

21. The modular lightbar as recited in claim 14 wherein said upper portion of said rail is defined by a top surface and a pair of side surfaces which extend therefrom in the direction of said rail lower portion, said side surfaces defining a rail cross-section which enlarges from said top surface in the direction of said rail lower portion.

22. The modular lightbar as recited in claim 14 wherein said rail side surfaces diverge relative to one another from said top surface in the direction of said rail lower portion.

23. A modular lightbar comprising:
   a unitary support for a plurality of light modules, said support including an elongated mounting rail having upper and lower portions, said rail having at least a first linear segment and at least a curvilinear segment extending from an end of said linear segment;
   foot means for affixing said rail to a surface, said foot means comprising at least two spacially displaced mounting feet disposed between said rail and the surface, each of said feet defining an open-sided slot which is generally complementary in shape to said lower portion of said rail, said rail lower portion being received in said slots and being engaged by said feet; and
   a plurality of light modules, each of said light modules comprising:
      a base, said base including a bottom wall and at least first and second opposing side walls, said base further having oppositely disposed front and rear sides which extend between said side walls, said bottom wall including an external open-sided base channel which extends longitudinally between said first and second side walls, said base channel being defined by plural surfaces and having a cross-sectional shape which is, at least in part, generally complementary to the cross-sectional shape of said upper portion of said mounting rail, said base channel engaging said rail upper portion to thereby at least in part support said module from said mounting rail, said front and rear sides of said base extending generally parallelly to said base channel, said base channel of at least one of said light modules having a curvilinear configuration in the longitudinal direction, said curvilinear configuration matching at least a portion of said curvilinear rail segment whereby said one light module may be mounted on said curvilinear rail segment;
      a light transmissive lens affixed to said base, said lens having side walls and front and rear sides, said lens walls and sides being shaped to cooperate with respective of said base walls and sides to define a chamber between said base and lens; and
      at least one light emitter disposed within said chamber, said one light emitter being mounted on said base and being positioned such that at least a portion of the light emitted by said one emitter will pass through said lens.

24. The modular lightbar as recited in claim 23 wherein said upper portion of said rail is defined by a top surface and a pair of side surfaces which extend therefrom in the direction of said rail lower portion, said side surfaces defining a rail cross-section which enlarges from said top surface in the direction of said rail lower portion, said top surface and side surfaces extending the length of said rail.

25. The modular lightbar as recited in claim 24 wherein said rail side surfaces diverge relative to one another from said top surface in the direction of said rail lower portion.

26. A modular vehicular lightbar comprising:
   a generally U-shaped light module support, said support comprising an elongated tubular mounting rail, said rail having at least a first linear segment and a pair of curvilinear segments, said curvilinear segments extending from opposite ends of said linear segment, said rail having upper and lower portions which extend along said segments between opposite ends of said U-shaped support; and
   a plurality of light modules positioned on said mounting rail, each of said light modules comprising:
      a base, said base having a bottom wall and a pair of opposing side walls which extend outwardly from said bottom wall, said base further having a rear wall which extends between said side walls, said bottom wall including an external channel which is proximal to said rear wall, said channel extending longitudinally between said pair of side walls and being substantially parallel to said rear wall, said channel being generally complementary in size and shape to said upper portion of at least a part of one of said segments of said rail, said channel of said base engaging said rail along a portion of the length of said rail which is sized and shaped to engage said channel;
      a light transmissive lens sealingly attached to said base, said lens and said base cooperating to define a chamber therebetween; and
      at least one light emitter disposed within said chamber, said one light emitter being affixed to said base and being positioned such that at least a portion of the light emitted by said one light emitter passes through said lens.

27. The modular lightbar of claim 26 wherein said channel of said base of at least a first of said light modules extends generally linearly between said pair of side walls and engages a linear segment of said U-shaped rail, and wherein said channel of said base of at least a second of said light modules base extends arcuately between said pair of side walls and engages a first of said curvilinear segments of said U-shaped light module support.

28. The modular lightbar of claim 27 wherein said channel of said base of at least a third of said light modules is curvilinear and complementary to at least part of the second of said curvilinear rail segments, and wherein said third light module is supported from said second curvilinear segment of said U-shaped light module support.

29. The modular lightbar as recited in claim 28 wherein said upper portion of said rail is defined by a top surface and a pair of side surfaces which extend therefrom in the direction of said rail lower portion, said side surfaces defining a rail cross-section which enlarges from said top surface in the direction of said rail lower portion.

30. The modular lightbar as recited in claim 29 wherein said rail side surfaces diverge relative to one another from said top surface in the direction of said rail lower portion.

31. The modular lightbar of claim 26 wherein said channel of said base of at least a pair of said light modules is curvilinear and complementary to at least part of said curvilinear rail segments, and wherein said pair of light modules are supported from respective of said curvilinear segments of said U-shaped light module support.

* * * * *